C. T. DENHAM.
HAULAGE APPARATUS
APPLICATION FILED JUNE 28, 1920.
1,396,627.
Patented Nov. 8, 1921.
3 SHEETS—SHEET 1.
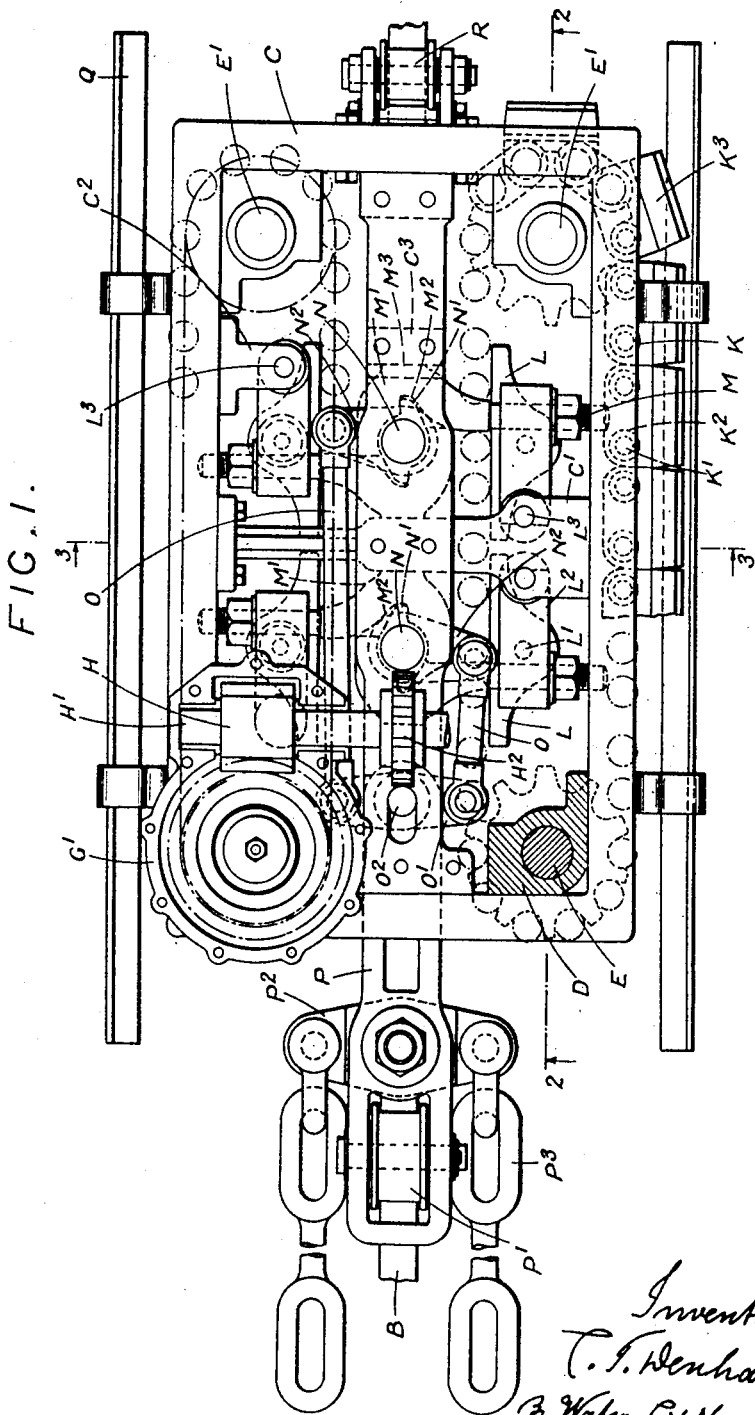

C. T. DENHAM.
HAULAGE APPARATUS.
APPLICATION FILED JUNE 28, 1920.
1,396,627.
Patented Nov. 8, 1921.
3 SHEETS—SHEET 2.
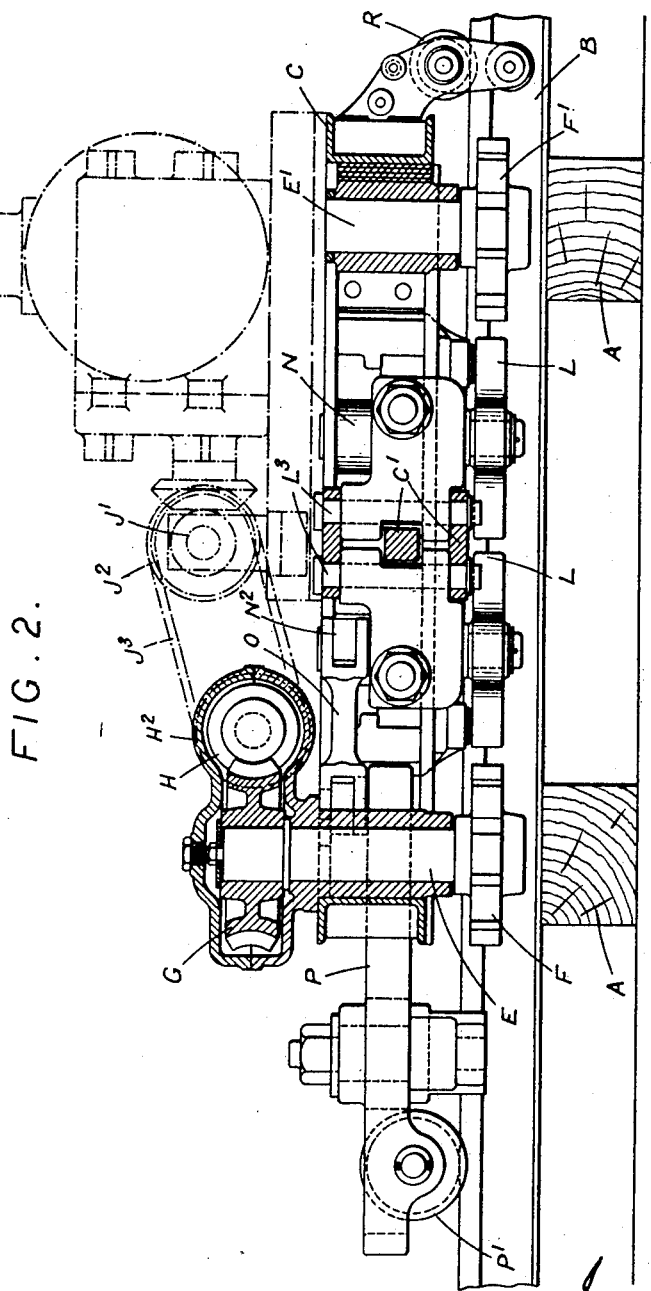

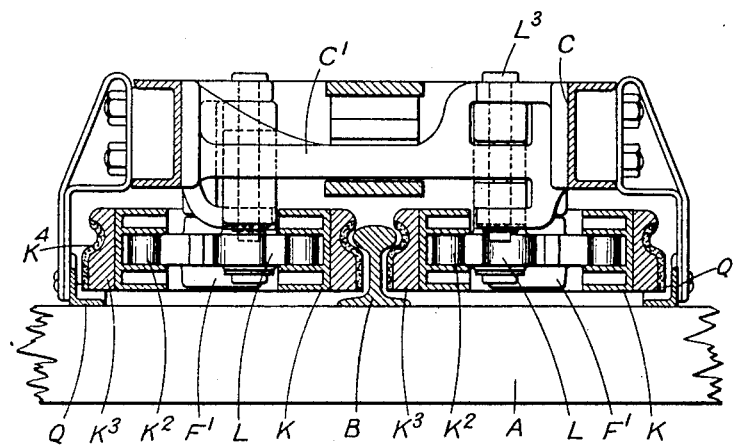

UNITED STATES PATENT OFFICE.

CHARLES THOMAS DENHAM, OF MASSA, ITALY.

HAULAGE APPARATUS.

1,396,627.

Specification of Letters Patent.  Patented Nov. 8, 1921.

Application filed June 28, 1920. Serial No. 392,498.

(GRANTED UNDER THE PROVISIONS OF THE ACT OF MARCH 3, 1921, 41 STAT. L., 1313.)

*To all whom it may concern:*

Be it known that I, CHARLES THOMAS DENHAM, a subject of the King of England, and resident of Massa, Italy, have invented certain new and useful Improvements in Haulage Apparatus, (for which I have filed an application in Italy, No. 491/87, (No. 170,369,) November 11, 1918,) of which the following is a specification.

This invention relates to haulage apparatus and has for its object to provide a construction which, while it is more particularly adapted for use in hauling loads up or lowering them down an inclined plane, is also capable of use in other ways as for example in hauling on a rope or chain.

According to this invention on a frame of suitable construction are mounted on substantially vertical spindles a pair of chain wheels one of which is driven or otherwise controlled. Around the wheels extends a chain having on its outer side members adapted to engage and grip a rail, chain, rope or the like while on its inner side are conveniently rollers which engage the teeth of the wheels. There is a second pair of chain wheels similarly mounted arranged and driven or otherwise controlled and having a similar chain running over them and the two pairs of wheels and chains are disposed on the frame so that the chains will travel opposite to each other on either side of the longitudinal center line of the apparatus and can engage and grip between them the rail or other longitudinal member pressure being applied to the inner sides of the chains along those parts which are opposed. Of the four chain wheels those wheels which form each pair are disposed one behind the other in a longitudinal direction in respect of the frame and opposite to and substantially in the same plane as the corresponding wheels forming the other pair. One wheel in each pair is controlled in some suitable manner and is conveniently driven from a suitable source of power through worm or other gear, for example an internal combustion or other engine suitably mounted drives a horizontal shaft which is disposed transversely on the frame and carries toward its ends worms which gear with worm wheels mounted on the spindles of the two chain wheels that are to be driven. The chain wheels are so disposed that the chains which run around them lie and move near and substantially parallel to each other on either side of the longitudinal center line of the apparatus with the outer faces of the chains opposed so that the gripping members on the outer faces of the chains will engage the rail, chain, rope or the like which extends longitudinally between the opposed faces of the chains. Behind those parts of the chains which are opposed movable members are placed these members being adapted to press against the chain rollers and force the chains toward each other and into gripping engagement with the longitudinal rail or other member. Means are provided whereby these members can be moved so as to exert a pressure on the chains in accordance with requirements and convenient movement of these members and the pressure exerted is determined by the load or the resistance to be overcome.

The invention may be carried out in various ways but the accompanying drawings illustrate by way of example a construction that may be adopted when applying the invention to the haulage of heavy bodies on an inclined plane such as blocks of marble, stone and the like.

In these drawings—

Figure 1 is a plan of the apparatus with portions removed or broken away to show the construction more clearly.

Fig. 2 is a vertical longitudinal section on the line 2—2 in Fig. 1 looking in the direction of the arrows.

Fig. 3 is a transverse section on the line 3—3 in Fig. 1 looking in the direction of the arrows.

Like letters indicate like parts throughout the drawings.

In the drawings the engine by means of which power is applied to the apparatus is omitted but the essential features of the mechanism by means of which power is applied are diagrammatically indicated in dotted lines in side elevation in Fig. 2.

In the application of the invention which is more particularly here described and illustrated the track over which the haulage is effected is laid down on an inclined plane and comprises a series of transversely disposed sleepers A suitably spaced apart and on them is fixed a centrally arranged rail B of suitable cross section the rail extending throughout the length of the track. The blocks of marble or other substance are usually placed on sledges or like structures carried on runners which rest on the sleepers A and these sledges slide down the inclined plane under control of the apparatus which afterward draws the empty sledges up the incline again. If the load has to be hauled up the incline trucks are employed with wheels which run on rails or tracks laid on the sleepers A on either side of the rail B.

The haulage apparatus is provided with a frame C of suitable construction this frame as shown being substantially rectangular in plan. Within each corner of the frame is a vertically arranged spindle carried in a suitably constructed bearing member D fixed in the angle of the frame. The two spindles E which lie in those corners of the frame which are situated at what may be termed the haulage end of the apparatus are of greater length than the spindles E' which lie at the opposite or foremost end of the apparatus. The spindles E' terminate at their upper ends in or about the plane of the upper surface of the frame C while the spindles E are prolonged so as to project to some extent above the frame C. On the lower end of each spindle E is fixed a chain wheel F while similar chain wheels F' are fixed on the lower ends of the spindles E'. On the upper end of each spindle E is a worm wheel G and these wheels mesh with two worms H respectively mounted toward the opposite ends of a transversely disposed shaft H' conveniently mounted in bearings carried by casings G' which inclose the worm wheels G and the worms H. At the center of the length of the shaft H' is a pinion or chain wheel H² by means of which power is applied to the shaft H' and communicated through the worms H and worm wheels G' to the spindles E and toothed wheels F.

The power may be derived from an engine J suitably disposed on the framing C and driving through gearing a countershaft J' carrying a chain wheel J² around which and the chain wheel H² runs a chain J³.

The four chain wheels F F' may be regarded as constituting pairs of wheels each pair comprising one chain wheel F and one chain wheel F' each pair of these wheels lying on one side of the fixed rail B when the truck carrying the apparatus is on the track. Around each pair of chain wheels F F' runs a chain K of substantial structure whose links are connected by pins K' which carry rollers K² adapted to engage the teeth of the wheels F and F'. On the outer face of the chain is mounted a series of blocks K³ each of which is conveniently faced on its outer side as at K⁴ with non-slipping material for example rubber. The faces of the blocks K³ are shaped in accordance with the cross section of the fixed rail B so as to engage one side of this rail, the relative positions of the blocks and the rail being clearly shown in Fig. 3. The two chains thus run between the chain wheels F F' forming each pair along each side of the rail B so that if those portions of the chains which extend between the wheels adjacent to the rail are pressed toward each other they can be caused to grip the fixed rail and the truck can thereby be moved up the incline or its movement down the incline controlled.

Pressure may be applied in various ways to the chains so as to cause them to grip the rail B. Conveniently the following construction is employed for this purpose. Between each pair of chain wheels F F' are mounted two shoes or like members L which extend longitudinally side by side behind the chain and are adapted to bear on the rollers K² carried by the chain. The faces of these shoes L lie substantially parallel to the rail B and the shoes are mounted so that they can move either separately or together in a direction transverse to the truck frame C and toward the central rail B. The shoes may be carried in various ways but conveniently each is connected by a pin L' to a bracket member L² which lies above the shoe and is supported at a point which is located above one end of the shoe by a pin L³ resting in a suitable bearing. The shoes at one side of the apparatus have these pins L³ carried by a rigid transverse member C' which extends across the frame C while at the other side of the machine the pins L³ are carried by brackets C² mounted on the inside of the lateral member of the frame C. Each shoe L with the bracket member L² which carries it can move about its pin L³ toward or away from the longitudinal center line of the apparatus this movement being effected in the following manner. Through each bracket member L² toward the end thereof remote from the pivot pin L³ passes a rod M with a hook-shaped end portion M' which projects on the inner side of the bracket L² the curvature of the hook-shaped portion M' lying in the horizontal plane. On the inside of this hook-shaped part is a recess M² and on the back of the hook-shaped part is a flattened portion M³ which bears against a transverse member C³ carried by the frame C. The hook-shaped members M' are arranged in pairs with their recesses M² facing each other and disposed on either side of short pins N carried in suitable bearings in the framing of the apparatus the axes of these pins N being vertical. Each pin N carries two lateral lugs N' which respectively engage the recesses M² in the hook-shaped members M' and on each pin N is also mounted a lever arm N². The arrangement is such that if a pin N is turned by movement of the lever arm N² the action of the lugs N' on the hook-shaped members M' will draw toward each other the two shoes L which lie on opposite sides of the central rail B. The shoes L will then turn on their pins L³ and by pressing against the rollers K² of the chains will cause the blocks K³ carried by the chains to grip the rail B. The hook-shaped members are prevented from moving away from the pins N and the lugs N' are kept in engagement with the recesses M² by the fixed members C' and C³, against which the backs of the hook-shaped members bear and on which they slide. It will be seen that the bracket members L² practically constitute levers which carry the shoes L while the rods M with their hook-shaped ends M' in effect act as links through which a pull can be exerted on the levers by the radial lugs or cams N' on the pins N.

From the lever arms N² run links O whose ends are pivotally connected to the ends of a two-armed transversely arranged lever O' which is carried about its center by a pin O² on the end of a draw-bar P. This draw-bar extends beyond the end of the frame C and carries at its end a roller P' which runs on the top of the rail B. Pivoted to the draw-bar P between the roller P' and the end of the frame C is a transversely placed two-armed lever P² to whose ends are connected links or chains P³ which are coupled in some suitable manner to the sledge or truck which is to be drawn. It will thus be seen that the pull exerted on the draw-bar P by the load will act through the equalizing lever O' and the links O and levers N² on the pins N and through the lugs N' carried by these pins such movement will be imparted to the shoes L as will cause the chain blocks K³ to grip the central rail B and thus the load will determine the grip which the chains exert on the central rail.

When in use the apparatus is substantially balanced on the central rail B by reason of the grip of the chains on this rail but conveniently lateral skids Q are provided and suitably fixed to the sides of the framing C these skids being arranged to rest on the sleepers A and slide over them. At the forward end of the frame a carrying roller R is conveniently arranged this roller being mounted in a bracket connected to the frame C. The weight of the apparatus is thus supported at the ends thereof by the rollers P' and R and intermediately by the skids Q or by the chains and adjacent parts of the mechanism when a grip is being exerted on the central rail. If desired carrying wheels may be provided to run on a flat track which may be laid down on either side of the rail.

The mechanism is adapted to run either way so that the load may be raised up an inclined surface or lowered the movement being controlled in the latter case in accordance with requirements and by suitable means.

If the apparatus is to be used for exerting a pull on a rope chain or the like after the manner of a winch the apparatus is conveniently inverted, that is to say, the chains and chain wheels are arranged on the upper side of the framing so that the rope or chain which is to be hauled can be placed in position between the chains or removed as desired. The gripping plates on the chains are suitably formed to engage the chain links or to grip the rope. The apparatus will thus operate to haul a rope or chain without the necessity of carrying the latter around a drum and the chain may be quickly released from the haulage device if it is desired to allow it to run out freely. Where the apparatus is thus fixed relatively to the chain or the like on which a pull is to be exerted, the regulation of the pressure applied to the chains through the movable shoes may be effected in various ways for example by separate adjustment of the pressure shoes. If however it is desired that this pressure be determined by the resistance on the rope which is being hauled in, the apparatus may be mounted so as to slide in the longitudinal direction and be connected to some fixed part by a draw-bar through which movement of the shoes is effected for example after the manner more particularly described above.

The details of construction may be modified to suit requirements and the purpose for which the apparatus is employed. Power may be applied to the chain wheels or their rotation controlled in various ways and the length of chain between the wheels may vary as also the number of pressure shoes or slippers disposed between the chain wheels forming a pair.

What I claim as my invention and desire to secure by Letters Patent is:—

1. In haulage apparatus the combination of a frame a pair of chain wheels mounted on vertical spindles carried by the frame and disposed toward the opposite ends thereof, a chain extending around these wheels and having on its inner side rollers which engage the teeth of the wheels, members mounted on the exterior of the chain and adapted to engage and grip a longitudinal member to which haulage power is to be applied, a second pair of chain wheels mounted and arranged similarly to the first pair, a chain with rollers and gripping members similar to the first chain and running over the second pair of chain wheels, the wheels and chains being disposed on the frame so that the chains travel opposite to each other on either side of the longitudinal center line of the apparatus and adjacent to the said longitudinal member which is to be gripped, means for applying pressure to the rollers on the inner sides of the chains and along those parts which are opposed and lie between the chain wheels, and means for controlling the rotation of the chain wheels as set forth.

2. In haulage apparatus the combination of a frame, a pair of chain wheels mounted on vertical spindles carried by the frame and disposed toward the opposite ends thereof, a chain extending around these wheels, members mounted on the exterior of the chain and adapted to engage and grip a longitudinal member to which haulage power is to be applied, a second pair of chain wheels mounted and arranged similarly to the first pair, a chain similar to the first chain running over the second pair of chain wheels, the wheels and chains being disposed on the frame so that the chains travel opposite to each other on either side of the longitudinal center line of the apparatus and adjacent to the said longitudinal member which is to be gripped, members disposed between the chain wheels behind those parts of the chains which are opposed these members being adapted to bear against the inner sides of the chains, means for imparting movement to these members and thereby applying pressure to the chains, and means for controlling the rotation of the chain wheels as set forth.

3. In haulage apparatus the combination of a frame, a pair of chain wheels mounted on vertical spindles carried by the frame and disposed toward the opposite ends thereof, a chain extending around these wheels, members mounted on the exterior of the chain and adapted to engage and grip a longitudinal member to which haulage power is to be applied, a second pair of chain wheels mounted and arranged similarly to the first pair, a chain similar to the first chain running over the second pair of chain wheels, the wheels and chains being disposed on the frame so that the chains travel opposite to each other on either side of the longitudinal center line of the apparatus and adjacent to the said longitudinal member which is to be gripped, and means for applying power to one chain wheel in each pair, as set forth.

4. In haulage apparatus the combination of a frame, a pair of chain wheels mounted on vertical spindles carried by the frame and disposed toward the opposite ends thereof, a chain extending around these wheels and having on its inner side rollers which engage the teeth of the wheels, members mounted on the exterior of the chain and adapted to engage and grip a longitudinal member to which haulage power is to be applied, a second pair of chain wheels mounted and arranged similarly to the first pair, a chain with rollers and gripping members similar to the first chain and running over the second pair of chain wheels, the wheels and chains being disposed on the frame so that the chains travel opposite to each other on either side of the longitudinal center line of the apparatus and adjacent to the said longitudinal member which is to be gripped, members disposed between the chain wheels behind those parts of the chains which are opposed these members being adapted to bear against the inner sides of the chains, means for imparting movement to these members and thereby applying pressure to the chains, and means for controlling the rotation of the chain wheels as set forth.

5. In haulage apparatus the combination of a frame, a pair of chain wheels mounted on vertical spindles carried by the frame and disposed toward the opposite ends thereof, a chain extending around these wheels, members mounted on the exterior of the chain and adapted to engage and grip a longitudinal member to which haulage power is to be applied, a second pair of chain wheels mounted and arranged similarly to the first pair, a chain similar to the first chain running over the second pair of chain wheels, the wheels and chains being disposed on the frame so that the chains travel opposite to each other on either side of the longitudinal center line of the apparatus and adjacent to the said longitudinal member which is to be gripped, shoes mounted between the chain wheels and behind the chains so as to be movable toward or away from them, link members through which movement can be imparted to the shoes, a draw bar on one end of the apparatus, means whereby the pull exerted on the draw bar is communicated to the link members so as to cause the shoes to bear against the inner sides of the chains and press them toward each other and into gripping engagement with the said longitudinal member, and means for controlling the rotation of the chain wheels as set forth.

6. In haulage apparatus the combination of a track, a rail mounted thereon and extending longitudinally along the track, a frame, a pair of chain wheels mounted on vertical spindles carried by the frame and disposed toward the opposite ends thereof, a chain extending around these wheels, members mounted on the exterior of the chain and adapted to engage and grip one side of the track rail, a second pair of chain wheels mounted and arranged similarly to the first pair, a chain running over the second pair of chain wheels and carrying members adapted to engage and grip the other side of the track rail, the wheels and chains being disposed on the frame so that the chains travel opposite to each other on either side and adjacent to the track rail, means for applying pressure to the inner sides of the chains between the chain wheels and along those parts of the chains which are opposed, and means for controlling the rotation of the chain wheels as set forth.

7. In haulage apparatus the combination of a track, a rail mounted thereon and extending longitudinally along the track, a frame, means for supporting the frame on the rail and on the track, a pair of chain wheels mounted on vertical spindles carried by the frame and disposed toward the opposite ends thereof, a chain extending around these wheels and having on its inner side rollers which engage the teeth of the wheels, members mounted on the exterior of the chain and adapted to engage and grip one side of the rail, a second pair of chain wheels mounted and arranged similarly to the first pair, a chain with rollers similar to the first chain running over the second pair of chain wheels and carrying members adapted to engage and grip the other side of the track rail, the wheels and chains being disposed on the frame so that the chains travel opposite to each other on either side of and adjacent to the track rail, means for applying pressure to the rollers on the inner sides of the chains and along those parts which are opposed and lie between the chain wheels, and means for controlling the rotation of the chain wheels as set forth.

8. In haulage apparatus the combination of a frame, a pair of chain wheels mounted on vertical spindles carried by the frame and disposed toward the opposite ends thereof, a chain extending around these wheels, members mounted on the exterior of the chain and adapted to engage and grip a longitudinal member to which haulage power is to be applied, a second pair of chain wheels mounted and arranged similarly to the first pair, a chain similar to the first chain running over the second pair of chain wheels, the wheels and chains being disposed on the frame so that the chains travel opposite to each other on either side of the longitudinal center line of the apparatus and adjacent to the said longitudinal member which is to be gripped, shoes mounted between the chain wheels and behind the chains so as to be movable toward or away from them, link members through which movement can be imparted to the shoes, a draw bar on one end of the apparatus, means whereby the pull exerted on the draw bar is communicated to the link members so as to cause the shoes to bear against the inner sides of the chains and press them toward each other and into gripping engagement with the said longitudinal member, and means for applying power to one chain wheel in each pair as set forth.

9. In haulage apparatus the combination of a track, a rail mounted thereon and extending longitudinally along the track, a frame, means for supporting the frame on the track rail and on the track, a pair of chain wheels mounted on vertical spindles carried by the frame and disposed toward the opposite ends thereof, a chain extending around these wheels, members mounted on the exterior of the chain and adapted to engage and grip one side of the track rail, a second pair of chain wheels mounted and arranged similarly to the first pair, a chain running over the second pair of chain wheels and carrying members adapted to engage and grip the other side of the track rail, the wheels and chains being disposed on the frame so that the chains travel opposite to each other on either side of and adjacent to the track rail, shoes mounted between the chain wheels and behind the chains so as to be movable toward or away from the opposed parts thereof, link members through which movement can be imparted to the shoes, a draw bar at one end of the apparatus, means whereby the pull exerted on the draw bar is communicated to the link members so as to cause the shoes to bear against the inner sides of the chains and press them toward each other and into gripping engagement with the track rail, and means for applying power to one chain wheel in each pair as set forth.

In testimony whereof I have signed my name to this specification.

CHARLES THOMAS DENHAM.